July 28, 1953     G. A. TINNERMAN ET AL     2,646,714
FASTENER STRIP
Original Filed June 10, 1948
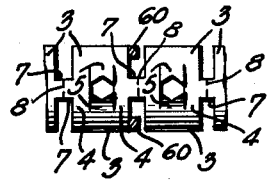
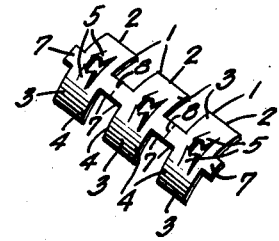
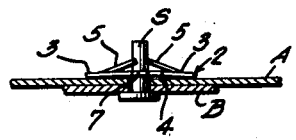
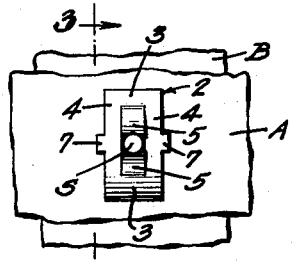
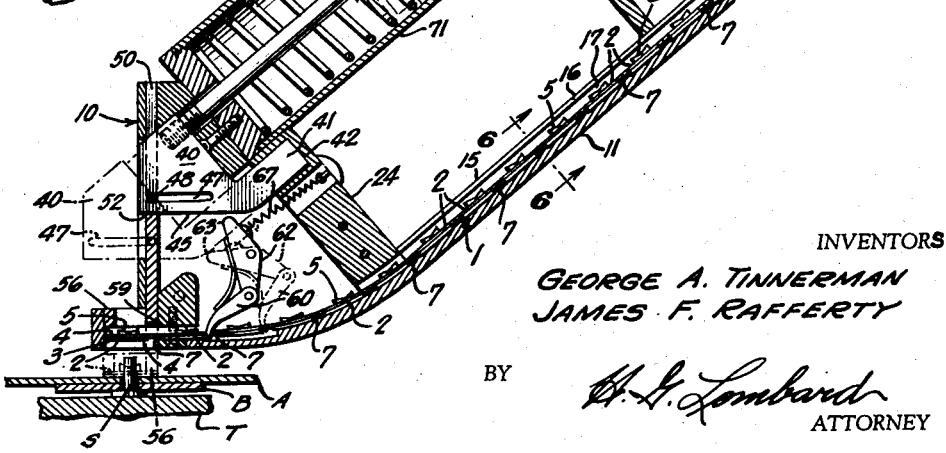
INVENTORS
GEORGE A. TINNERMAN
JAMES F. RAFFERTY
BY *H. G. Lombard*
ATTORNEY Patented July 28, 1953

2,646,714

UNITED STATES PATENT OFFICE 2,646,714

FASTENER STRIP

George A. Tinnerman and James F. Rafferty, Cleveland, Ohio, assignors to Tinnerman Products, Inc., Cleveland, Ohio, a corporation of Ohio Original application June 10, 1948, Serial No. 32,146. Divided and this application October 2, 1951, Serial No. 249,366

2 Claims. (Cl. 85—36)

This invention relates to improvements in sheet metal or spring nut fastening devices as prepared in a continuous strip and adapted to be applied individually by a suitable tool to locked fastening engagement on a fastening stud of any nature such as the shank of a rivet, an integral connecting shank on a part to be secured, or a conventional bolt or screw. This application is a division of application Serial Number 32,146 filed June 10, 1948 and issued November 13, 1951 as Patent Number 2,575,320, and which is directed to a form of tool adapted to apply the fastening devices automatically.

A tool of this character is employed to apply such fasteners in the form of sheet metal or spring nut devices which are constructed of relatively thin sections of sheet metal or heat treated, tempered spring steel from which stud engaging means are struck and formed to project upwardly out of the plane thereof when engaged with a stud or other shank under tension. The tool is readily adaptable to use for applying such fasteners in any form, particularly the kind having an upwardly arched or bowed base that is tensioned in fastening position to cause the stud engaging means to exert an axial drawing action on the stud which provides a tightened fastening assembly of the parts secured under constant spring tension. Due to the inherent resiliency of the spring metal and the manner in which the stud engaging means are provided, such spring fasteners are capable of quick, easy application to fastening engagement onto a bolt or stud by a substantially direct, axial, thrust-like force which effects a sliding engagement of the said stud engaging means with the stud to the applied fastening position of the fastener in which the stud engaging means are disposed in locked embedded engagement with the stud, and the tensioned base of the fastener exerts a continuously effective axial drawing action on the stud to ensure a locked tightened installation of the parts secured, as aforesaid.

Inasmuch as these spring nuts and similar fasteners are often small and difficult to manipulate in applying the same to fastening position on the studs, the handling of the fasteners is greatly facilitated when they are prepared in strip form and secured by a tool which is designed for automatically applying the individual fasteners in any number and otherwise automatically feeding the fasteners successively into position for application by the tool in a minimum of time and effort on the part of the operator, thereby greatly reducing the cost and time involved in many types of assemblies produced by mass production methods.

A primary object of the invention, therefore, is to provide an improved fastener strip comprising a series of sheet metal spring nuts or the like, of the kind described, which are adapted to be readily separated from the strip in the application thereof by a tool to locked fastening position on a cooperating stud or shank.

Another object of the invention is to provide a strip of spring nut fasteners of this character in which the individual fasteners are each connected to the next adjacent spring nut by an integral web portion which is severed in the application of the spring nut to locked fastening position on a cooperating stud or shank.

A tool which is especially designed for applying spring nut fasteners of the kind described, as prepared in strip form, preferably is constructed to apply the fasteners in a manner in which the fasteners are not subjected to undue bending forces and strains in the handling, feeding and application thereof. The arrangement is such that when the fasteners used are of the type which have the advantageous generally arched or bowed base construction, such fasteners are prepared in strip form with the arched bases extending transversely of the strip and joined at their sides by connecting web portions which are severed to cut each fastener from the strip without in any way distorting or deforming the fasteners from their original arched configuration as designed for most effective application to the stud or other shank, as aforesaid.

A further primary object of this invention, therefore, is to provide an improved construction for a strip of fasteners for use in a tool, such as described, which comprises a series of spring nuts, or the like, having generally arched bases extending transversely of the strip and connected together by web portions between the sides of adjacent fasteners of the strip.

Further objects and advantages of the invention and other new and useful features in the construction and arrangement thereof will be readily apparent as the following description proceeds with reference to the accompanying drawings, for purposes of illustration but not of limitation, in which like reference characters designate like parts throughout, and in which:

Fig. 1 is a vertical sectional view through the body of a tool containing a strip of fasteners in accordance with the invention and showing the tool in position for applying a fastener from the strip to a stud in an assembly of parts to be secured;

Fig. 2 is a top plan view of the assembly of the parts secured showing the spring nut fastener in applied fastening position on the stud or other shank;

Fig. 3 is a sectional view of Fig. 2 along line 3—3, showing the applied fastener in edge elevation;

Fig. 4 is a perspective view illustrating the fasteners in accordance with the invention as prepared in strip form;

Fig. 5 is a top plan view of a fragment of the fastener strip illustrating the disposition of the strip in the tool and the arrangement for advancing the strip by the feeding mechanism of the tool; and, Fig. 6 is an enlarged sectional view of Fig. 1 along line 6—6, looking in the direction of the arrows, showing the formation of the guideway of the tool for accommodating the fasteners in strip form.

The sheet metal or spring nut devices prepared in strip form in accordance with the invention are constructed from relatively thin sections of any suitable sheet metal, preferably spring metal or cold rolled metal having spring characteristics. As shown in Figs. 2 and 3, any such sheet metal or spring nut fastener is employed to secure a fastening assembly of any two or more parts A, B, by means of a stud or shank S. The stud S is provided in any desired manner as by an integral stud on one of said parts extending through an opening in the other, or by the shank of a rivet, bolt or screw passing through aligned openings in said parts and having the head thereof suitably bolstered for the fastening operation as by a work table T, Fig. 1. By way of example, one type of such a fastener as prepared in the form of a strip 1 is shown in Figs. 4 and 5, with each fastener comprising a generally rectangular section 2 defined by end portions 3 and bridge or side portions 4 between which integral yieldable stud engaging means such as tongues 5, for example, are formed to extend upwardly for engaging a stud or other shank under tension. The said end and bridge portions provide what may be termed, the body of the fastener, which body is so formed in the stamping operation as to present a normally untensioned, generally arched, bowed, or concave base. When such a fastener is applied to the shank of the stud or bolt, the yieldable stud engaging elements 5 readily slide along the shank to the point at which the fastener base contacts the adjacent work surface or part secured; at such point, the end portions 3 are moved from their initial, normally untensioned position in the generally concave or arched base outwardly and upwardly in a substantial lifting force which is transmitted to the tongues 5 to urge the extremities thereof inwardly toward each other such that said tongues are caused to dig into and become embedded in the shank and resist any tendency toward reverse movement or loosening. At the same time, the bowed side portions 4 are elongated such that the generally concave base assumes the position of a substantially flat or only slightly arched plate in anchored relation with the stud or shank. The bending moment which serves to anchor the nut device onto the stud or bolt is produced by the tensioned side and end portions which are flattened against the adjacent surface of the work, and which, in attempting to resume their initial, normally untensioned configuration in the generally concave base, assume only a slightly bowed or arched formation and thereby urge the tongues or stud engaging elements 5 inwardly toward each other to locking engagement with the stud, and simultaneously exert an axial drawing action on the stud to provide a tightened fastening assembly of the parts secured under constant spring tension.

As shown in Figs. 4 and 5, the spring nuts 2 are prepared in the form of a strip 1 with their generally arched or bowed bases extending transversely of the strip and with the sides of the adjacent fasteners joined by connecting webs 7 which are severed by the tool along the dotted lines 8 to separate the individual fasteners 2 from the strip just prior to the application of a severed fastener to secure an assembly of parts, as aforesaid. The provision of the fasteners 2 with their arched bases extending transversely of the strip is most important from the standpoint of manufacture of the strip inasmuch as the fasteners may thus be stamped and formed in an arched or bowed base formation with the ends of each fastener extending free in the normal untensioned configuration of the fastener and without distortion or deformation of any nature for application to fastening position on a stud or shank in the most effective manner, as presently to be described.

The tool, designated generally 10, comprises an elongate base 11 having a generally flat plate portion at its forward end which is adapted to be applied in generally horizontal relation to an assembly of parts to be secured; and from this region the base 11 preferably is curved gradually upwardly to define a downwardly inclined chute or guide portion 15 which facilitates the movement of the fastener strip 1 as it is advanced forwardly in the tool. The chute or guide portion 15 comprises undercut side flanges 16 providing guideways 17, Fig. 6, receiving the longitudinally edges of the fastener strip defined by the ends 3 of the aligned fasteners 2.

The reciprocating cross head 40 comprises a rearward guiding and supporting projection 41 which is received in an opening 42 in the rearward block 24 to support said cross head in inoperative position. The lower edge of said cross head 40 defines a cam surface 45 which coacts with the ram or plunger 50 to reciprocate said ram when said cross head 40 is actuated. The reciprocating head 40 is provided with a guide slot 47 for a transverse pin 48 which is secured at its ends to the reciprocable ram 50. The ram 50, Fig. 1, comprises a vertical slide rod portion having a cam edge 52. The cam surface 45 on the cross head 40 is in engagement with said cam edge 52 on the ram and accordingly, on forward movement of the cross head to the position illustrated in broken lines in Fig. 1, said cam surface 45 drives the ram downwardly for a fastener applying operation. During this movement of the cross head 40, the transverse pin 48 slides in the slot 47, and on return of the cross head to its initial position, said pin 48 serves to lift the ram 50 and return the same to its normal position in the tool for the next fastener applying operation.

The ram 50 otherwise is provided with a clamping or presser foot portion 56 on its lower end having an open generally rectangular recess or slot extending transversely of the tool. The presser foot or clamping portion 56 is provided in accordance with the size of the fasteners 2 to define side clamping portions and end clamping portions for fitting onto and engaging the side portions 4 and end portions 3, respectively, of a spring nut 2 or similar fastener. The most effective locking action of the spring nut devices in a tight, rigid installation is obtained when the generally arched or concave bases thereof are flattened without any substantial pressure being exerted on the stud engaging elements or tongues 5. Any substantial pressure on the stud engaging elements 5 prevents the same from having smooth, sliding engagement with the shank of the bolt or stud on being applied, and also deforms the same with respect to the generally concave base such that the extremities of the tongues are not in most effective contact with the shank, whereupon the tongues have a tendency to slip in a tightened assembly thereby resulting in a loose, faulty installation.

In the use of the tool, a tight installation is ensured and any such tendency of the tongues or stud engaging elements to slip or loosen from applied fastening position is eliminated inasmuch as the clamping foot 56 is designed for advancing a fastener to locked fastening engagement on a stud by pressure applied directly to the side portions 4 and end portions 3 to flatten the generally concave base without engaging the stud engaging means 5, and thus, when the tool is withdrawn and the attendant pressure removed from the flattened side portions 4, the tension stored therein causes the tongues 5 to become embedded in the stud in the most effective manner. The rearward edge 59 or heel of said ram otherwise serves as a sharp cutter edge which operates to sever a fastener from the strip when the ram is actuated.

The open rectangular slot formation of the presser foot 56 is of considerable importance in the use of the tool inasmuch as such an open slot provides a sight opening which enables the operator to locate easily and quickly the proper position for the fastener to be applied to the stud. In other words, by such sight opening, the tool is readily positioned to locate the fastener to be applied with the stud engaging elements of the fastener equally centered on opposite sides of the stud for proper engagement therewith. Otherwise, when the ram is actuated, said stud engaging tongues 5 of the fastener and/or the studs are mutilated or deformed under force of the ram such that a faulty application of the fastener results.

The feeding mechanism for automatically advancing the fastener strip 1 within the tool comprises a pair of cooperating dogs 60 pivotally attached on opposite sides of a lever or link 62 the upper end of which defines a cam follower surface 63. The extremities of said dogs 60 positively engage the sides of the fasteners 2, as seen in Fig. 5, to advance the strip in step by step relation in the tool. A leaf spring attached to the lever 62 bears yieldably upon said dogs 60 to urge the same downwardly into engagement with the fastener strip but capable of yielding as necessary to ride over a fastener and engage the next succeeding fastener to move the strip forwardly the width of one fastener for each operation of the tool. A coil spring 67 is attached at one end to the lever 62 and serves to pull said lever and thereby urge the dogs 60 forwardly for a feeding operation. In the normal position of the feed mechanism thus provided, the cam follower end 63 on the pivoted lever 62 extends into the path of the cam surface 45 on the cross head 40. And accordingly, on forward movement of the cross head 40, the lever 62 and dogs 60 carried thereby are caused to move to the position of the broken line showing in Fig. 1. The arrangement is such that the extremities of the dogs 60 slide rearwardly over the immediately adjacent fastener and drop downwardly into positive engagement with the side of said fastener. On the return movement of the cross head 40, the link 62 is free to return to its initial position under force of the distended coil spring 67 which automatically causes the dogs 60 to urge the strip 1 forward a distance approximating the width of the fastener previously engaged thereby.

The means for reciprocating the cross head 40 comprises a fluid pressure device 70 operated by compressed air or other fluid pressure means. Various other means may be employed for actuating the cross head 40 but the fluid pressure device shown provides a compact efficient mechanism contained within a cylinder 71 which is so mounted as to serve also as a handle for the tool.

It will be understood that in the operation and use of the tool for applying fasteners in accordance with the invention, the tool is loaded with a strip of the fasteners 2 substantially as shown in Fig. 1. The fasteners may be provided in any selected length of strip 1 or in a considerable quantity provided by a similar strip in a roll mounted on a reel, for example. In any event, when the leading end of a strip 1 is loaded into the tool, the fasteners 2 slide within guide channel 15 as shown in Fig. 1 to a position in which the foremost fastener 2 is disposed under the clamping or presser foot 56 of the ram 50. In this position, the side portions 4 of the foremost fastener underlie the side clamping portions of the presser foot while the end portions 3 underlie the end portions of said presser foot and the cutter edge 59 is adapted to cut the connecting web 7 along the dotted line 8, Figs. 4 and 5, to sever said foremost fastener from the next adjacent fastener of the strip. It will be understood that the connecting web 7 holds the foremost fastener 2 in the tool as described in preparation for the severing and applying of the fastener. Also, the cooperating dogs 60 slips over the foremost fastener 2 when the strip is initially inserted in the tool and engage the side of the next adjacent fastener as shown in Fig. 1 to hold the strip in the tool and in readiness for a feeding of the strip to advance said next adjacent fastener after the foremost fastener has been severed from the strip and applied.

With the tool thus loaded with a strip of fasteners, the tool is positioned over the stud S in an assembly of parts to be secured and so located that the stud engaging means or tongues 5 of the fastener to be applied are suitably centered with respect to the stud S of the assembly. The tool is then actuated by the operator upon pressure on the handle lever 86 which admits compressed air or other fluid pressure into the cylinder 71 to project the cross head 40 downwardly to the broken line position shown in Fig. 1 both to actuate the ram 50 and set the feeding dogs 60 for a feeding movement of the strip after actuation of said ram 50.

Both of these results are effected during a single forward movement of the cross head 40 by means of the cam surface 45 thereon. Thus, said cam surface 45 engages the cam edge 52 on the ram to drive the ram downwardly in a direct axial thrust by which the cutter edge 59 on the clamping foot first severs the foremost fastener 2 from the strip and then simultaneously pushes the severed fastener directly onto the stud S to secure the parts of the assembly, as aforesaid.

During this same forward movement of the cross head 40, the said cam surface 45 thereon engages the cam follower surface 63 on the pivoted lever 62 to pivot the same to the broken line position shown in Fig. 1 in which the dogs 60 carried by said lever ride rearwardly over the next succeeding fastener 2 to the position in which the extremities of said dogs 60 drop downwardly into positive abutting engagement with the side edge of said succeeding fastener, as illustrated in Fig. 5.

When the foremost fastener has been applied, the handle lever 80 is released to permit the escape of the air within cylinder 71, such that the cross head 40 returns to its initial position raising the ram 50 and disengaging from the cam follower surface 63 on the pivoted lever 62, whereupon said lever 62 is returned to its initial position under force of the distended coil spring 67. Such return motion of the pivoted lever 62 causes the dogs 60 carried thereby to move forwardly and thereby advance the strip 1 as necessary to locate the next fastener 2 under the clamping or presser foot 56 in readiness for the next operation of the tool.

While the invention has been described in detail with a specific example, such example is intended as an illustration only, inasmuch as it will be apparent that various modifications may be devised without departing from the spirit and scope of the invention.

What is claimed is:

1. A strip of fasteners comprising a length of sheet metal defining a series of plate-like fasteners having openings centrally thereof provided with stud engaging means and extending in side by side relation, each of said fasteners having a generally arched body extending transversely of the strip between the ends of each fastener, a portion partially connecting a side of each fastener to the side of the adjacent fastener, each fastener in the strip having free ends entirely separated from the adjacent fasteners and the arched body of each fastener projecting above said free ends thereof.

2. A strip of fasteners comprising a length of sheet metal defining a series of plate-like fasteners having openings centrally thereof provided with stud engaging means and extending in side by side relation, each of said fasteners having a generally arched body extending transversely of the strip between the ends of each fastener and a web portion connecting a side of each fastener to the side of the adjacent fastener, there being oppositely directed slots extending from the web portion between the ends of adjacent fasteners whereby the ends of said adjacent fasteners extend free and separate from each other and are adapted to rest on a surface with said arched body of each fastener projecting above said surface.

GEORGE A. TINNERMAN.
JAMES F. RAFFERTY.

References Cited in the file of this patent

UNITED STATES PATENTS

| Number | Name | Date |
|---|---|---|
| 2,229,708 | Tinnerman | Jan. 28, 1941 |
| 2,315,209 | Kost | Mar. 30, 1943 |
| 2,329,158 | Gill | Sept. 7, 1943 |